Sept. 10, 1935.　　　L. B. McNAMARA　　　2,014,236
JUICE EXTRACTOR AND FEEDER
Filed Nov. 23, 1932
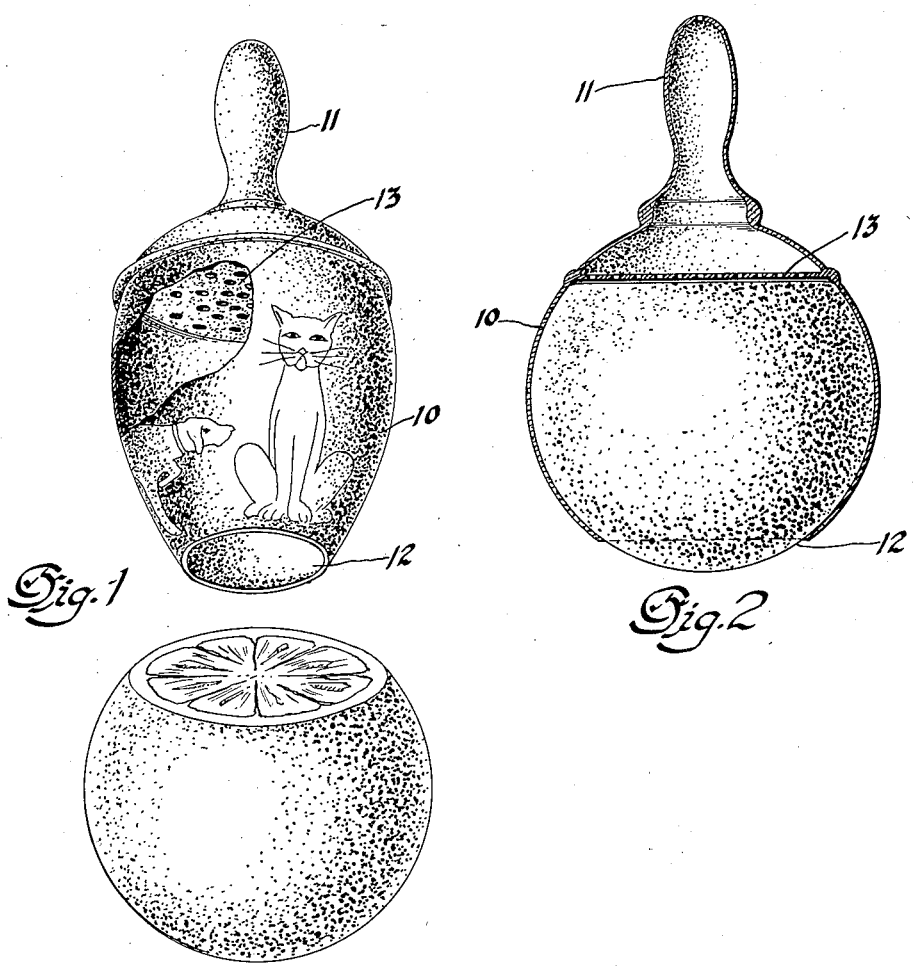
Inventor
Lena Brooke McNamara
By
Attorney

UNITED STATES PATENT OFFICE 2,014,236

JUICE EXTRACTOR AND FEEDER

Lena Brooke McNamara, Norfolk, Va.

Application November 23, 1932, Serial No. 644,012

10 Claims. (Cl. 100—35)

This invention is a result of my dissatisfaction with the conventional methods of supplying children with the orange juice which is considered a desirable, if not an essential, part of their diet and resides in an article in which juice may be extracted from an orange and simultaneously and conveniently fed to a child.

For a better understanding of the nature and objects of this invention, reference is made to the following specification in which there is described the preferred embodiment of my invention which is illustrated in the accompanying drawing.

In the accompanying drawing:

Figure 1 shows, in perspective, with part of the body broken away a juice extractor and feeder in which my invention is embodied and an orange prepared for insertion in the extractor and feeder.

Figure 2 is a longitudinal section through the juice extractor and feeder shown in Figure 1 after the orange has been inserted into it.

As shown in the drawing, my juice extractor and feeder consists of a receptacular body 10 on whose one end there is formed a perforated nipple 11, in whose opposite end there is formed an opening 12 and within which, adjacent the end on which the nipple is formed, there is provided a sieve or strainer 13. The juice extractor and feeder is preferably made entirely of rubber and may be formed in one piece or of a number of integrally united parts. The nipple should, of course, be made of rather thin and flexible rubber and, as will appear hereinafter, the body should be made of thin, flexible and highly elastic rubber. The sieve or strainer may, of course, be made considerably thicker and less flexible than the nipple and body.

To employ my juice extractor and feeder in supplying a child with orange juice, one merely removes a small portion of or punctures one end of an orange, stretches the opening 12 in the body sufficiently to permit insertion of the orange, and inserts the orange into the body through the opening so that the end which has been punctured or from which a portion has been removed faces the sieve or strainer. If the nipple is then placed in the child's mouth and the body of the extractor and feeder squeezed, juice of the orange will be squeezed out of it and drawn into the child's mouth. It is apparent that the sieve or strainer 12 will prevent any of the seeds or fibrous parts of the orange clogging the nipple or reaching the child's mouth.

It will, of course, be understood that it is preferable to use in my juice extractor and feeder oranges which are of such size that it will be necessary to stretch the body considerably to insert them into it so that when the orange is reduced in size, as a result of squeezing and the consequent extraction of juice, the body will still fit sufficiently tightly around the orange to prevent the loss of juice through the opening 12.

It will be apparent that my extractor and feeder has many advantages over the devices now commonly used to feed a child orange juice. Its use involves a minimum of labor, loss of orange juice and muss. Much less care is necessary in handling and cleaning my extractor and feeder after use than is necessary in handling and cleaning a nursing bottle. The use of my extractor and feeder eliminates the spattering of both the child and its attendant with orange juice which usually results when an attempt is made to feed him juice directly from the orange or with a spoon.

It will, of course, be understood that although I have shown and described my extractor and feeder as a means to supply children with orange juice, it may be used to supply them with the juices of other articles which may be extracted by pressure.

I claim:

1. In an article for use in extracting juice from juice-containing bodies, a receptacular element which is elastically expansible to a considerable extent and is of such form and size that it is capable of encompassing and gripping by virtue of its own inherent characteristics more than one-half of a juice-containing body, there being provided in the receptacular element an opening through which a juice-containing body is adapted to be inserted into it.

2. In an article for use in extracting juice from juice-containing bodies, a receptacular element which is elastically expansible to a considerable extent and is of such form and size that it is capable of encompassing and gripping by virtue of its own inherent characteristics a juice-containing body, there being provided in the receptacular element an opening through which a juice-containing body is adapted to be inserted into it and a juice-discharge opening.

3. In an article for use in extracting juice from juice-containing bodies, a receptacular element which is elastically expansible to a considerable extent and is of such form and size that it is capable of encompassing and gripping by virtue of its own inherent characteristics a juice-containing body, there being provided in the receptacular element an opening through which a juice-containing body is adapted to be inserted into it and a juice-discharge opening, and a strainer associated with the juice-discharge opening.

4. In an article for use in extracting juice from juice-containing bodies, a considerably expansible receptacular element which is adapted to encompass and by virtue of its own inherent characteristics resiliently to embrace a juice-containing body, there being provided in the receptacular element an opening through which a juice-containing body is adapted to be inserted into it, and a nipple connected to the receptacular element and communicating with the interior thereof.

5. In an article for use in extracting juice from juice-containing bodies, a considerably expansible receptacular element which is adapted to encompass and by virtue of its own inherent characteristics resiliently to embrace a juice-containing body, there being provided in the receptacular element an opening through which a juice-containing body is adapted to be inserted into it, a nipple connected to the receptacular element and communicating with the interior thereof, and a strainer associated with the nipple.

6. In an article for use in extracting juice from juice-containing bodies, a receptacular element of material which is elastically extensible to a considerable extent and is of such form and size that it is capable of encompassing and gripping by virtue of its own inherent characteristics more than one-half of a juice-containing body, there being provided in the receptacular element an opening through which a juice-containing body is adapted to be inserted into it.

7. In an article for use in extracting juice from juice-containing bodies, a receptacular element of material which is elastically extensible to a considerable extent and in which there is provided an opening through which a juice-containing body is adapted to be inserted into it and a juice-discharge opening.

8. In an article for use in extracting juice from juice-containing bodies, a receptacular element of material which is elastically extensible to a considerable extent and in which there is provided an opening through which a juice-containing body is adapted to be inserted into it and a juice-discharge opening, and a strainer associated with the juice-discharge opening.

9. In an article for use in extracting juice from juice-containing bodies, a considerably expansible receptacular element of flexible, elastic material in which there is provided an opening through which a juice-containing body is adapted to be inserted into it, and a nipple connected to the receptacular element and communicating with the interior thereof.

10. In an article for use in extracting juice from juice-containing bodies, a considerably expansible receptacular element of flexible, elastic material in which there is provided an opening through which a juice-containing body is adapted to be inserted into it, a nipple connected to the receptacular element and communicating with the interior thereof, and a strainer associated with the nipple.

LENA BROOKE McNAMARA.